(12) United States Patent
Apostolos et al.

(10) Patent No.: US 8,494,472 B1
(45) Date of Patent: Jul. 23, 2013

(54) RECONFIGURABLE CHIRP FOURIER TRANSFORM BASED CONTINUOUS CONVOLUTION PROCESSOR

(75) Inventors: John T. Apostolos, Lyndeborough, NH (US); Judy Feng, Nashua, NH (US); William Mouyos, Windham, NH (US)

(73) Assignee: AMI Research & Development, LLC, Windham, NH (US)

( * ) Notice: Subject to any disclaimer, the term of this patent is extended or adjusted under 35 U.S.C. 154(b) by 0 days.

(21) Appl. No.: 13/431,477

(22) Filed: Mar. 27, 2012

Related U.S. Application Data

(60) Provisional application No. 60/468,278, filed on Mar. 28, 2011, provisional application No. 61/502,210, filed on Jun. 28, 2011, provisional application No. 61/582,882, filed on Jan. 4, 2012.

(51) Int. Cl.
*H04B 1/00* (2006.01)
*H04B 15/00* (2006.01)
*H04B 1/10* (2006.01)
*G11C 19/28* (2006.01)
*H03H 7/30* (2006.01)
*H03H 7/38* (2006.01)

(52) U.S. Cl.
USPC ........... 455/296; 455/63.1; 455/222; 333/165

(58) Field of Classification Search
USPC .................. 455/425, 63.1, 550.1, 222, 278.1, 455/283, 286, 296, 299, 306, 307, 339; 333/165, 333/166, 167, 186, 202
See application file for complete search history.

(56) References Cited

U.S. PATENT DOCUMENTS

| | | | |
|---|---|---|---|
| 4,247,939 A | 1/1981 | Stromswold et al. | |
| 4,305,159 A | 12/1981 | Stromswold et al. | |
| 4,336,511 A | 6/1982 | Stromswold et al. | |
| 4,532,603 A * | 7/1985 | Gerard | 708/813 |
| 4,633,257 A | 12/1986 | Apostolos et al. | |
| 4,641,143 A | 2/1987 | Apostolos | |
| 4,646,099 A | 2/1987 | Apostolos | |
| 4,649,392 A | 3/1987 | Apostolos | |
| 4,654,667 A | 3/1987 | Apostolos et al. | |
| 4,656,642 A | 4/1987 | Apostolos et al. | |
| 4,808,950 A | 2/1989 | Apostolos et al. | |
| 4,870,420 A | 9/1989 | Apostolos | |
| 5,029,235 A | 7/1991 | Apostolos et al. | |
| 5,079,735 A | 1/1992 | Apostolos | |
| 5,343,207 A | 8/1994 | Stromswold et al. | |
| 5,495,502 A * | 2/1996 | Andersen | 375/235 |
| 6,121,856 A | 9/2000 | Apostolos | |
| 6,252,542 B1 * | 6/2001 | Sikina et al. | 342/174 |
| 6,252,543 B1 * | 6/2001 | Camp | 342/357.29 |
| 6,366,627 B1 | 4/2002 | Apostolos et al. | |
| 6,486,828 B1 * | 11/2002 | Cahn et al. | 342/363 |
| 6,677,883 B2 * | 1/2004 | Apostolos | 342/13 |
| 7,123,181 B2 | 10/2006 | Apostolos | |
| 7,642,963 B2 | 1/2010 | Apostolos et al. | |
| 2002/0033766 A1 * | 3/2002 | Pratt | 342/357.06 |
| 2007/0135051 A1 * | 6/2007 | Zheng et al. | 455/63.1 |
| 2008/0036597 A1 * | 2/2008 | Harman | 340/552 |
| 2008/0218429 A1 * | 9/2008 | Johnson et al. | 343/893 |
| 2011/0183622 A1 * | 7/2011 | Apostolos et al. | 455/63.1 |

* cited by examiner

*Primary Examiner* — Andrew Wendell
(74) *Attorney, Agent, or Firm* — Cesari and McKenna, LLP (57) ABSTRACT

Reconfigurable Chirp Fourier Transform (CFT) based continuous convolution apparatus(es) and method(s) that are effectively used, for example, in interference cancellation applications.

12 Claims, 5 Drawing Sheets

RECONFIGURABLE CHIRP FOURIER TRANSFORM BASED CONTINUOUS CONVOLUTION PROCESSOR

RELATED APPLICATION(S)

This application claims the benefit of U.S. Provisional Application No. 61/468,278, filed on Mar. 28, 2011, U.S. Provisional Application No. 61/502,210, filed on Jun. 28, 2011 and U.S. Provisional Application No. 61/582,882 filed on Jan. 4, 2012.

The entire teachings of the above application(s) are incorporated herein by reference.

BACKGROUND

The electromagnetic spectrum is becoming increasingly crowded due the proliferation of wireless systems. Commercial and military applications face performance degradation due to the proximity of multiple high power systems. The presence of high power interference can even make detection of desired signals impossible. A multiplicity of filters is one method to mitigate performance degradation. The usual way to create such a filter bank for wideband telecoms applications is to use analog ultrasonic Surface Acoustic Wave (SAW) or bulk wave filters, micromechanical filters, or dielectric resonators. Other approaches digitize the whole band of interest and then synthesize whatever assortment of filters is necessary.

Wideband applications, dynamic range considerations and cost limit the utility of whole-band digital approaches. Fixed banks of analog filters with their attendant lack of agility are not effective at reducing interference in the highly dynamic emerging situations.

SUMMARY

The present disclosure is directed to a wide-band interference mitigation solution that uses an analog based, reconfigurable continuous convolution processor. In preferred embodiments, the processor is implemented using a chirp fourier transform (CFT) processor. The CFT processor implements continuous convolution by either mixing two or more overlapping periodic chirp signals or by mixing a wide-band chirp signal of at least twice duration of the periodic chirp signal used in the forward DFT process.

Generally speaking, a vector modulator applied to the convolution process may implement any sort of desired filtering function. In a specific implementation of interest, the filtering function may remove interfering signals that are estimated using an adaptive approach. One implementation, the adaptive canceller uses least mean square (LMS) fit to create spatial nulls at the location of interfering signals.

In co-site environments, the system can sample offending source signals and adjust the frequency domain weights of the CFT convolver to isolate a victim receiver. In co-location applications, a sensing antenna can provide the signal of the offending interferer.

An additional degree of freedom for processing UHF band satellite communication (SATCOM) signals can utilize differences in waveform polarization to provide further isolation.

The result is a low cost, low power interference cancellation solution that is not only wide-band but can also handle multiple interferers. The developed signal interference cancellation techniques allow for detecting the presence of co-site and co-located interferers utilizing hardware and software, resulting in a compact device that can be integrated into existing communication receivers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments.

DETAILED DESCRIPTION OF AN EMBODIMENT

CFT Based Continuous Convolution

A chirp Fourier transform (CFT) is a type of Fourier transform which lends itself more readily to an analog implementation than a straight Fourier transform. The methodology of the chirp Fourier transforms is as follows:

1. Multiply the input spectrum by a chirped waveform,
2. Convolve the chirped input spectrum with the impulse response function of the matched dispersive delay line, and
3. Multiply the convolved result by the inverse of the input chirp multiplier. In an analog implemention, steps 1 and 3 are accomplished with mixers and step 2 is often accomplished by utilizing a dispersive delay line (DDL).

CFTs thus potentially offer a very effective way to create "filters on demand" for wideband applications. Like a wideband digitization/FFT solution, the CFT can provide a single wire solution. A single wire system has advantages over parallel filter banks in that there are no cross talk or multicoupler problems.

Figure 1:
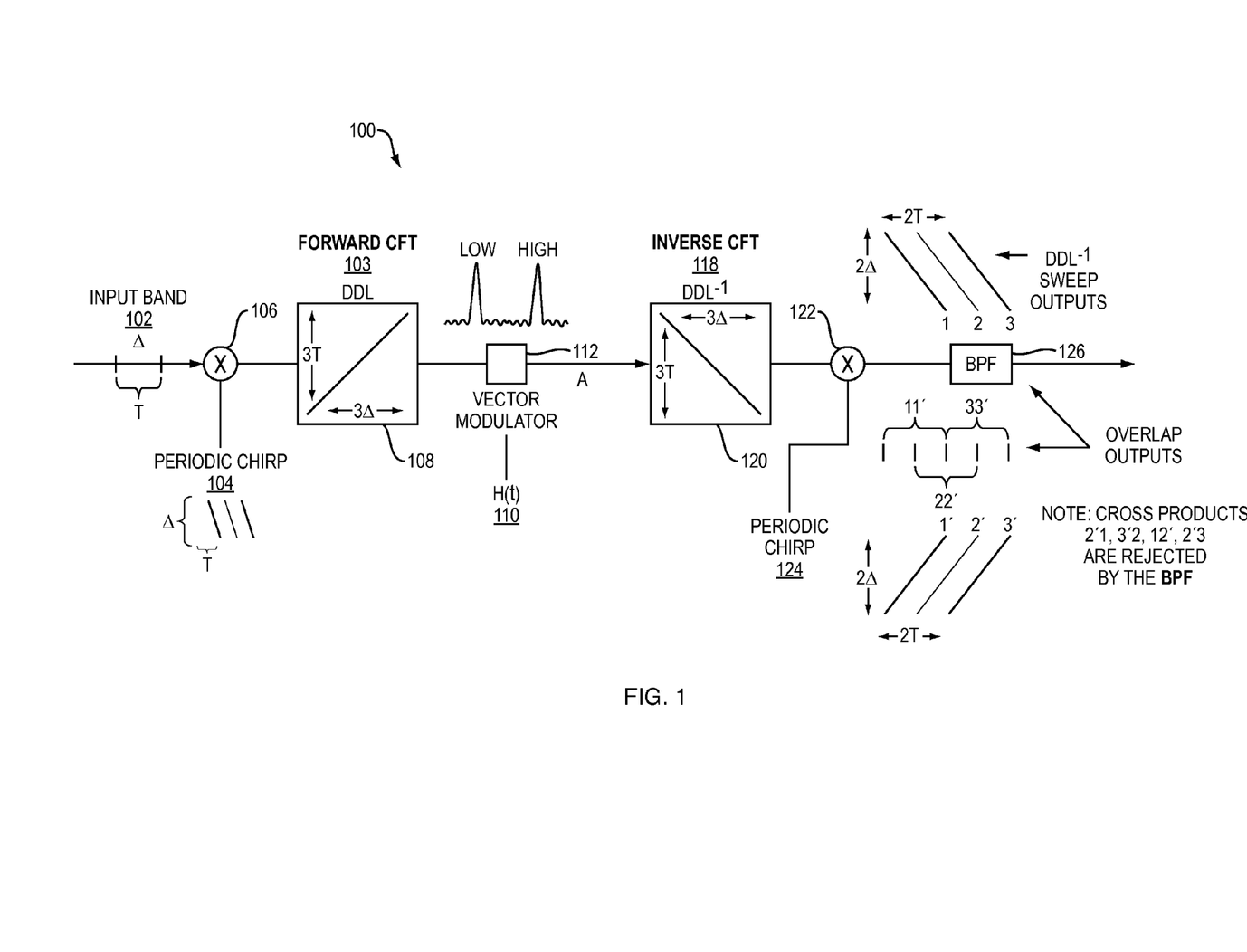
FIG. 1 illustrates a CFT based, single wire continuous convolution process.

FIG. 1 illustrates one methodology for a single wire CFT-based continuous convolution process. The input band 102 is transformed into the frequency domain by a forward CFT 103 that consists of a periodic chirp generator 104, mixer 106 and Dispersive Delay Line (DDL). The periodic chirp 104 permits the implementation of a continuous convolution algorithm analogous to overlap-add. In other words, the periodic chirps 104 can be configured to be analogous to a digital solution where overlapping FFTs are sequentially added to effect a continuous convolution.

A vector modulator (complex multiplier) 110 generates amplitude and phase functions in the frequency domain required to synthesize any filter, H(t), of interest. Furthermore, any number of these filters can be generated simultaneously across the input band(s) of interest.

An inverse CFT 118 then converts the energy back into the time domain. The inverse CFT 118 consists of an inverse DDL 120, a second periodic chirp generator 124 and mixer 122.

One arrangement of periodic chirps 124 in the inverse CFT 118 to achieve continuous convolution is shown in FIG. 1, for an input periodic chirp 104 of bandwidth Δ and duration T. In this implementation the output periodic chirps 124 are of length 2T and overlap the input chirps by ½; however other configurations with different chirp lengths and corresponding different fractional overlaps are also possible.

The bandpass filter (BPF) 126 on the output then removes higher order cross-modulation products. But by using dispersive delay lines (DDLs) 108 and 120 of somewhat wider bandwidth that the input (e.g., a DDL bandwidth of 3Δ with an input bandwidth of Δ) and a band pass filter on the output, a single wire solution is possible.

Figure 2:
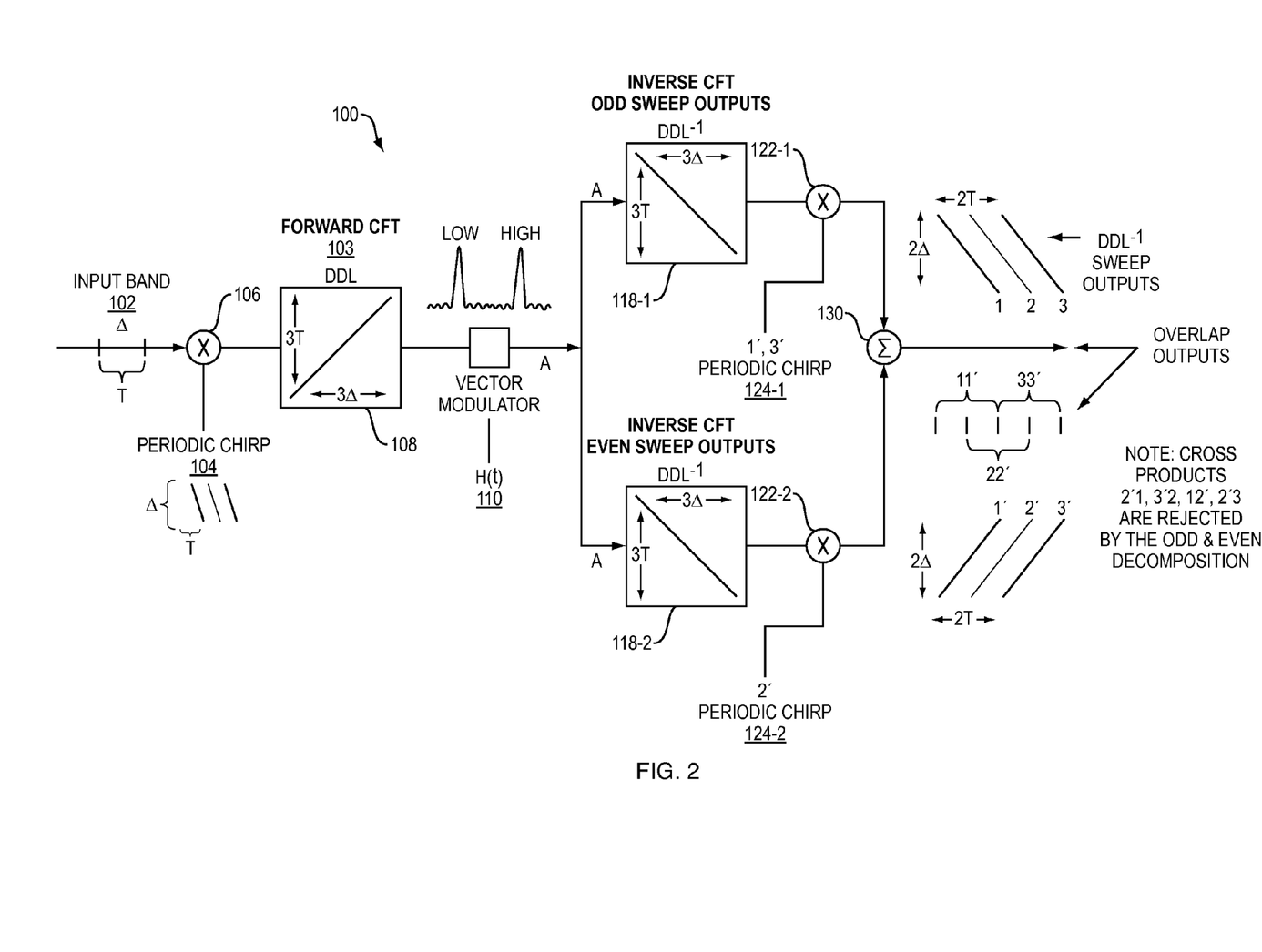
FIG. 2 illustrates an alternative two wire CFT based continuous convolution process.

An alternative architecture is a two wire solution as shown in FIG. 2. The forward CFT portion is the same as the single wire approach of FIG. 1. However, here there are two parallel inverse channels, an EVEN and ODD channel, that operate in "ping pong" to make the convolution continuous. This approach uses a pair of wider bandwidth DDLs (bandwidth 3Δ and duration 3T). Titanium dioxide (TiO2) low loss, wide bandwidth surface electromagnetic wave dispersive delay lines using amorphous materials are amenable to wideband, high dynamic range applications.

The architecture also requires a pair of inverse chirp generators 124-1, 124-2 and mixers 122-1, 122-2. The inverse chirps of duration 2T are overlapped by ½, as for the single wire case. As with the single wire case, other inverse chirp durations and corresponding overlaps are possible.

The EVEN and ODD channel outputs from the mixers 122-1, 122-2 are then summed 130 to provide the output. Any cross products are thus rejected by the resulting decomposition in the EVEN and ODD sum, due to the overlapping inverse chirps 124-1, 124-2.

Interference Mitigation General Case

The cancellation of interfering signals, which may or may not be directly impinging on signals of interest, can be provided by the synthesis of adaptive filters H(t) which create wide band spatial nulls corresponding to the interference. For a co-site application, either of the approaches of FIG. 1 or FIG. 2 can be used to implement a continuous convolution. Energy is tapped off from the offending signal on the common platform and injected into the filter H(t) 110. The system thus operates on the interfering signal in such a way as to obtain a wideband replica of that signal as it appears at the input of a "victim" receiver. The signals are subtracted to effect a cancellation, which does not affect any signals of interest since there is usually low cross correlation between the interfering signal and the signals of interest.

Figure 3:
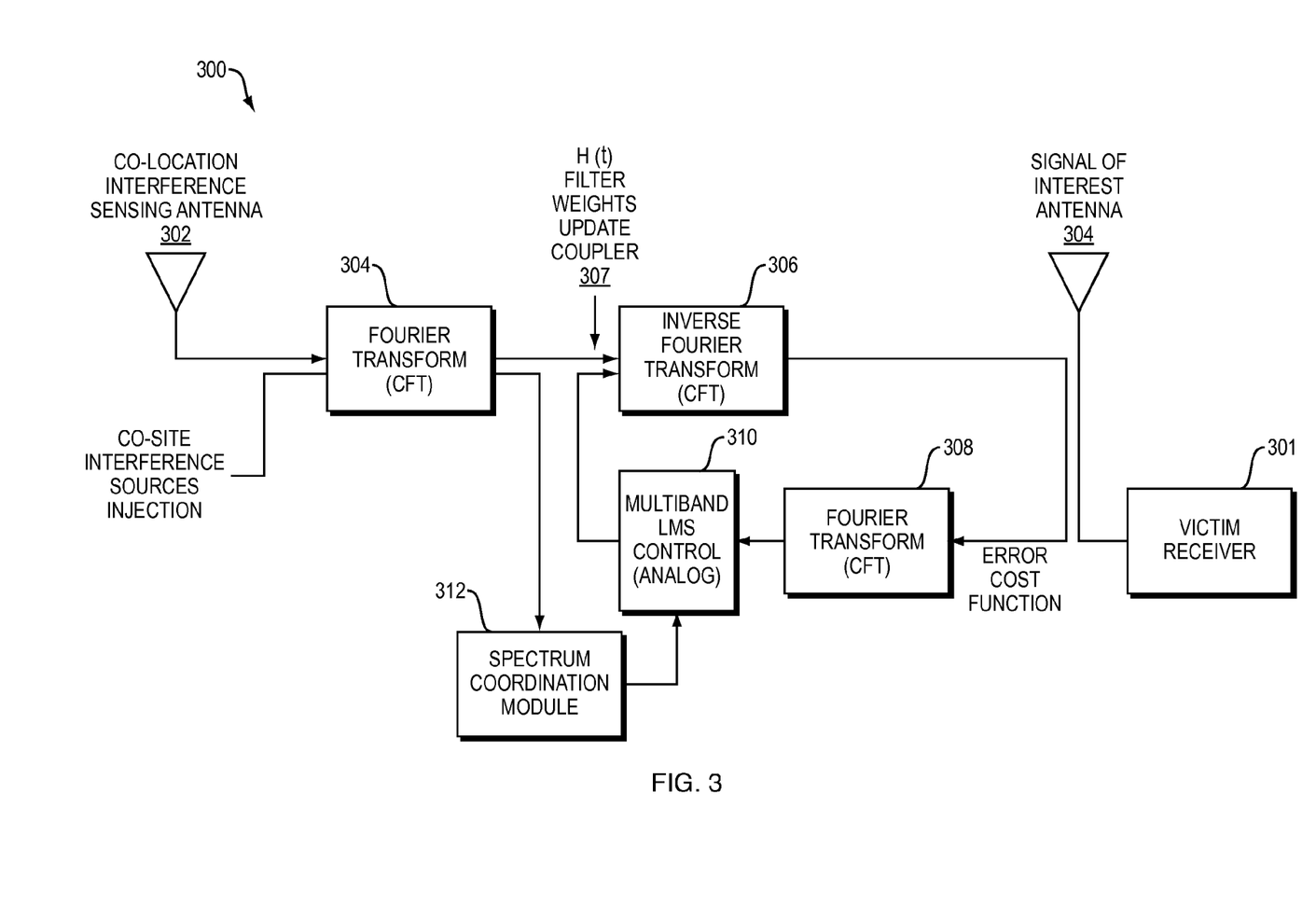
FIG. 3 shows a wide-band co-site/co-location interference mitigation approach using the CFT based continuous convolution processor.

These signal paths are shown in FIG. 3 showing a block diagram of a wideband co-site/co-location interference mitigation system 300 that uses a CFT based continuous convolution processor. The system 300 consists of a victim receiver 301, co-location interference sensing antenna 302, a forward transform (CFT) 304 and inverse transform 306 as described previously in connection with either FIG. 1 or FIG. 2, a signal of interest antenna 304, a forward transform (CFT) 308 to process a signal received from the victim receiver 301, a multi-band least mean squared (LMS) controller 310 and spectrum coordination module 312. The system 300 acts as an adaptive filter and attempts to converge to a point where the filter transfer function H(t) is close to the transfer function of the path between the offending transmitter/antenna 302 and the "victim" receiver antenna 304.

CFT 308 provides a spectrum of the victim receiver input to a Least Mean Square (LMS) control 310 which estimates the spectrum and then drives the application of weights to the filter H(t). The filter weights 307 for function H(t) can be determined by means of a gradient steepest descent method which minimizes the error in a cancellation. The steepest descent method takes the partial derivatives of the error function with respect to the filter weights and a negative gradient is used to generate a sequential update algorithm which minimizes the cost function. This algorithm updates the filter weights in the frequency domain as applied via the filter function H(t) in FIG. 3. The coefficient update function residing in the multiband LMS control 310 is proportional to the input spectrum supplied by the spectrum coordination module 312 multiplied by the error.

It is possible to split the input band up into sub bands, each associated with particular offending signals. This allows multiple signals to be cancelled simultaneously. The multiple sub bands are created by the CFT in the error cost function branch with cost functions associated with each sub band.

The co-location problem requires an interference sensing antenna 302 to pick up energy from the offending transmitter, which are external to the platform. The procedure is essentially the same as the co-site case, except coordination is necessary to guarantee that cancellation is not exercised on a signal of interest. The spectrum coordination module 312 shown in FIG. 3 continuously examines the spectrum to identify signals of interest using a library of signals. The least mean squares algorithm 310 minimizes the error function until a null is created where the interfering transmitter is located.

UHF Satcom Interference Mitigation Use Case

The above general approach to interference cancellation can also be further adapted to a solution utilizing polarization diversity to mitigate co-location interference in a UHF Satcom system. The two channel approach, where right-hand circular polarization (RHCP) and left-hand circular polarization (LHCP) are simultaneously used, is an enabler for providing mitigation of interference over a wideband (e.g., 5 MHz) channel. The approach uses the natural difference between interfering electromagnetic waves and the electromagnetic wave format of the desired signal. The difference in polarization between the two is measured with a dual output antenna installed on the platform. A high degree of interference rejection is therefore expected to be possible and independent of multipath because the signal receiving antenna is also used for sensing the interference and the phase centers for all polarizations are congruent. The approach can be implemented using a real time technique which continuously creates nulls at the physical locations of the multiple interfering signals and takes advantage of the known polarization of the SATCOM signal making it possible to use frequency, polarization and spatial domain processing to converge to a solution.

Figure 4:
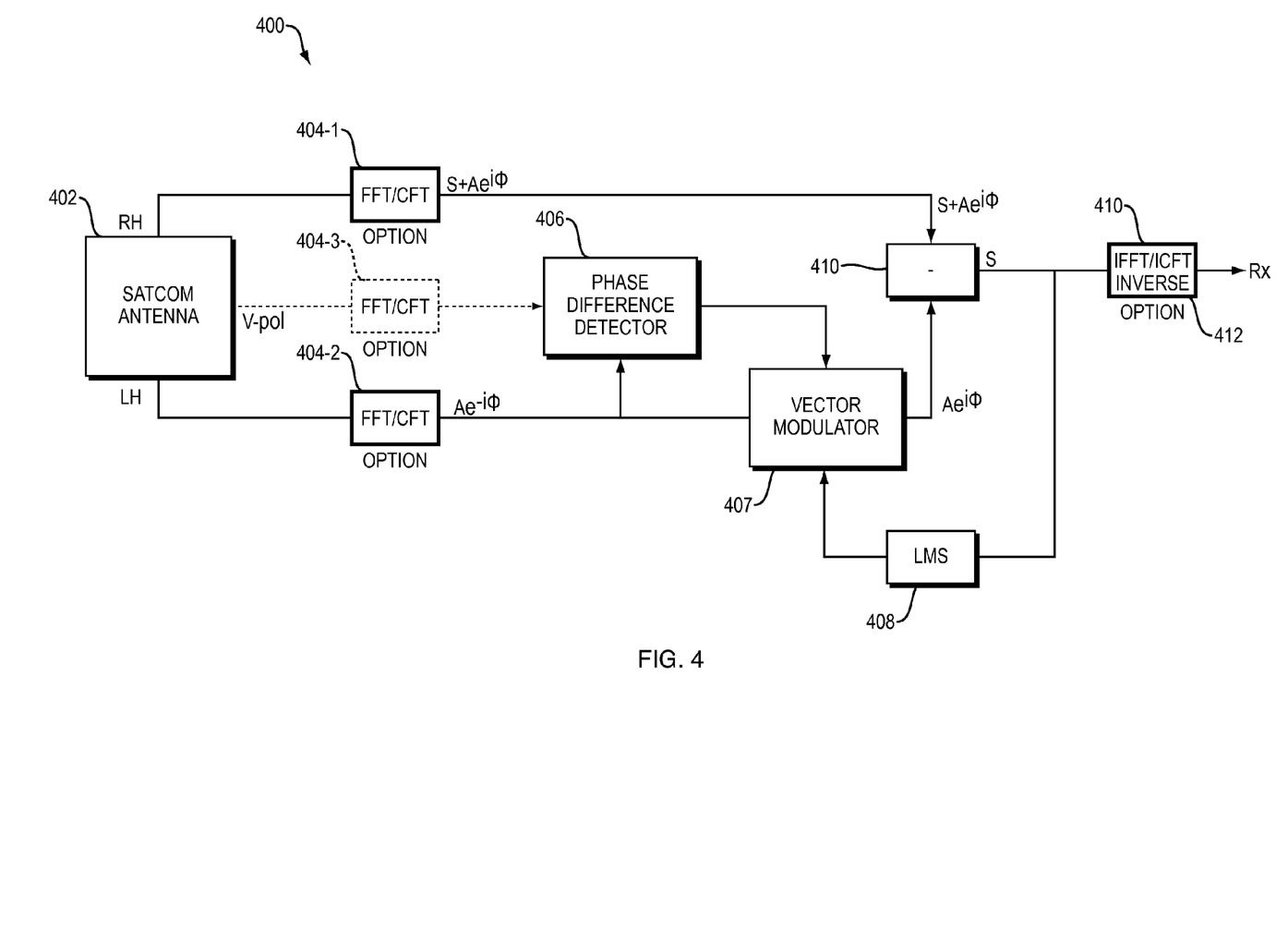
FIG. 4 illustrates a co-location polarization filter for isolating signals or multiple interferers suitable for SATCOM applications.

FIG. 4 shows a block diagram of such a polarization filter 400 for the single/multiple interferer cases. Polarization filtering allows for accurate detection of interference without changing the signal of interest, where a Least Mean Square (LMS) 408 algorithm is implemented in the frequency domain.

The polarization interference mitigation process consists of five (5) steps:
 1. Parallel channel polarization decomposition into right hand (RH) and left hand (LH) circular polarization (optionally Vertical Polarization (V-POL)), provided by a SATCOM antenna 402 itself,
 2. Transformation (404-1, 404-2 optionally 404-3) into the frequency domain using fast-fourier-transforms (FFTs) or preferably chirped-fourier-transforms (CFTs) of each channel,
 3. Application of phase difference detection 406 in the frequency domain, 4. Application of a least mean square (LMS) process 408 on all interfering signals using a vector modulator 407 and a difference detector 406 to create spatial nulls to determine the filtering function, and
5. Transform back to time domain using an inverse FFT/CFT 410.

The co-location polarization filter 400 detects and processes the RH and LH polarization decomposition of incident RF fields, to provide a high degree of discrimination between the desired, S, and interfering, $Ae^{j\phi}$, signals. Therefore a high quality copy of only the interference is obtained, even in the co channel interference case. The Least Mean Square (LMS) algorithm 408 implemented in the frequency domain which uses data from the polarization filter as an initial estimate drastically reduces the complexity of the interference weighting filter realization.

Instantaneous detection of non-CP emitters, which for SATCOM radios would be interferers, and their frequencies can be done in conjunction with fast real-time spectrum analysis. One of many unique capabilities with analog CFT processors (also known as compressive receivers) is that they provide frequency domain transforms with several nanoseconds latency, and can resolve signals down to tens of kHz. The approach shown in FIG. 4 thus measures instantaneous phase difference (and also polarization) of the RF environment at the radio's antenna. The CFT approach is used when necessary for speed and bandwidth; or a digital FFT is used for narrow band cases. This coupling of CFT processing with non-CP detection results in not only amplitude vs. frequency, but the polarization of every signal detected. By measuring the angle phi ($\phi$) via detection 406, the slant of all linear polarized signals in the spectrum can be obtained. Before an inverse CFT 410 they may then be synthesized in the correct amplitude and phase to be subtracted from the signal of interest, s, plus interference which is incident on the radio. Once initial estimates are made, an LMS algorithm 408 is used to further refine the complex weighting.

In an optional configuration, the V-pol output from antenna 402 may be fed to a third FFT/CFT 404-3. This provides an optimized approach to phase detection 406 when the received interfering signals are modulated.

Figure 5:
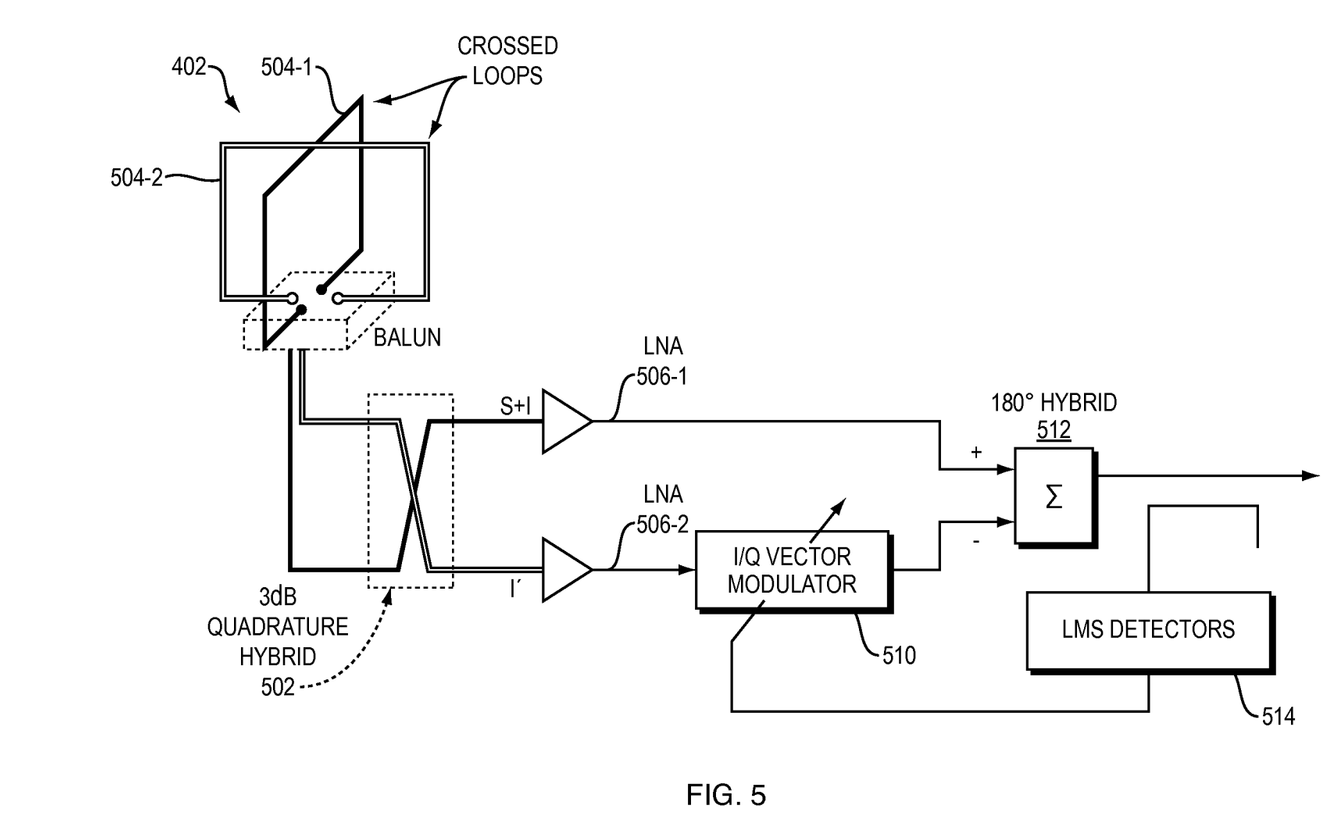
FIG. 5 illustrates a single interferer polarization filter.

FIG. 5 is a more detailed view of a circularly polarized antenna 402 arrangement used with a single interferer polarization filter. A 90 degree 3 dB hybrid coupler 502 combines the outputs of two (2) cross looped receiving elements, 504-1, 504-2, and the left (LH) and right hand (RH) polarizations are taken at the coupler output ports. In the general case, linearly polarized waves are thus received by both elements and combined at the coupler 502. The resulting outputs have opposing phase angles, plus and minus $\phi$, relative to a 45° slant polarization referred to the elements' orientations. This is due to each element responding to only the component of the E-field in its direction, and the 90 degree phase relationship of their voltage summation in the hybrid. Circularly polarized signals of interest, S, with interference only arrive out of one (1) of the hybrid coupler 502 outputs, the other being interference (I) only. LMS detectors 514 and vector modulator 510 provide feedback for recharging the effect of to interference to zero at the output of 180° combiner 512.

The UHF SATCOM antenna shown in FIGS. 4 and 5 is optimized for dual-polarization outputs, and both RHCP and Left Hand Circular Polarization (LHCP), and vertically polarized (V-pol) optimal outputs, necessary for this co-location solution provided. For more details, see corresponding U.S. patent application Ser. No. 13/404,626 filed Feb. 24, 2012 entitled "Extended Performance Satcom Orian Antenna" the entire contents of which are hereby incorporated by reference.

Extracting the interference from the normally terminated LHCP port of the quadrature hybrid 502 provides more effective interference nulling for three (3) reasons:

1. There is much less of the desired signal leaking in with the interference because of the RHCP/LHCP polarization isolation,
2. The interfering signal comes from an antenna having exactly the same phase center as that of the desired signal. The RF bandwidth is not limited by phase matching to a "sense" antenna since group delays are equal over a much wider frequency range, and
3. There is a natural gain and phase balance between the two channels so that equalization of amplitude and phase for cancellation can be done without the distortion or added noise inherent in systems with lopsided gain characteristics.

Since the receiver noise floor at typically SATCOM frequencies (240-270 MHz) will be somewhat externally limited by atmospheric and galactic noise, an ultra-low noise figure is not required. Amplifiers 506-1, 506-2 with 2-3 dB noise figure have compression points of typically +20 dBm and up to 40 dB gain can be achieved. A cascade analysis is done which determines the allowable loss in the vector modulator 510. These devices allow broadband phase and amplitude control over typically 30 dB and 360 degrees. Because of the natural channel and phase center matching it is anticipated that a non-dispersive equalizer can be used to generate nulls over a wide bandwidth. This is important because it reduces the control requirements on the vector modulator 510. If there were dispersion, more vector modulators would be required, becoming tap weights in a transversal equalizer. Again, the advantages of having separate and isolated interference and desired signals coming from two (2) ports on the same antenna cannot be overemphasized and is an important feature of the system.

This solution to mitigating interferers is unique and novel. By taking advantage of the known polarization of the UHF SATCOM signal one is able to simplify the way we deal with the issue. The solution here has the benefits of being fast at responding to the offending signal since it will be present through our polarization filtering solution. By incorporating a hybrid analog/digital solution we are able to minimize SWaP while ensuring performance is met. The main benefit is that since these technologies are available in the near term the system can be fielded quickly.

While this invention has been particularly shown and described with references to example embodiments thereof, it will be understood by those skilled in the art that various changes in form and details may be made therein without departing from the scope of the invention encompassed by the appended claims.

What is claimed is:

1. A method for filtering an input signal carried out in a device that includes a dispersive delay line comprising:
    feeding the input signal to a forward Chirp Fourier Transform (CFT), where the forward CFT further comprises:
    generating a forward periodic chirp signal;
    mixing the input signal with the forward periodic chirp signal, to produce a mixed signal;
    feeding the mixed signal to said forward dispersive delay line (DDL), to produce a DDL output signal;
    modulating the DDL output signal with a filter function H(t), to produce a filter function output signal;

feeding the filter function H(t) output signal to an inverse Chirp Fourier Transform (CFT) to produce an output signal; and the method for filtering resulting in a continuous convolution process by a subsequent mixing step of, within the inverse CFT, either:

(a) subsequent mixing by two or more overlapping inverse periodic chirp signals; or (b) subsequent mixing by a wide band inverse periodic chirp signal of at least twice a duration of the forward periodic chirp signal used in the forward CFT process; and, further bandpass filtering the output signal from the inverse CFT, to reject cross products introduced by one of the subsequent mixing steps (a) or (b).

2. The method of claim 1 wherein the filtering is used to mitigate interference.

3. The method of claim 2 additionally comprising:

adaptively estimating the interference to provide an interference estimate; and determining the filtering function from the interference estimate.

4. The method of claim 3 wherein adaptively estimating further uses a least mean square (LMS) fit to create spatial nulls corresponding to the interference.

5. The method of claim 2 additionally comprising:

sampling an interfering signal;

in response thereto, adjusting weights of the filtering function.

6. The method of claim 2 wherein the interference cancellation is further for isolating a victim receiver.

7. The method of claim 2 additionally wherein:

the input signal is received as a pair of first and second polarized signals; and the first polarized signal is fed to a first forward CFT; and the second polarized signal is fed to a second forward CFT.

8. The method of claim 1 wherein the forward periodic chirp signal has a bandwidth $\Delta$ and duration T; and the forward DDL has a bandwidth $3\Delta$ and a duration 3T.

9. The method of claim 8 further wherein the inverse CFT comprises an inverse dispersive delay line (DDL) having a bandwidth $3\Delta$ and a duration 3T.

10. The method of claim 1 wherein adjacent ones of the inverse periodic chirps are overlapped in time by ½.

11. A method for interference cancellation in a device that comprises an antenna that provides a right-hand (RH) polarized and left hand (LH) polarized radio frequency input signal, the method comprising:

forward converting the RH polarized signal to a frequency domain representation of the RH polarized signal;

forward converting the LH polarized signal to a frequency domain representation of the LH polarized signal;

detecting interference using a least mean square (LMS) estimate to provide an interference estimate;

determining a filtering function form the interference estimate;

applying a filtering function to the RH and LH frequency domain representation signals to provide a filtered signal; and inverse converting the filtered signal to produce a radio frequency output signal.

12. The method of claim 11 wherein the steps of forward converting and inverse converting comprise chirp Fourier transforming.

* * * * *

UNITED STATES PATENT AND TRADEMARK OFFICE
CERTIFICATE OF CORRECTION

PATENT NO. : 8,494,472 B1  
APPLICATION NO. : 13/431477  
DATED : July 23, 2013  
INVENTOR(S) : John T. Apostolos et al.

It is certified that error appears in the above-identified patent and that said Letters Patent is hereby corrected as shown below:

On the title page, item [60] should read:  
Provisional application No. ~~60/468,278~~ 61/468,278, filed on Mar. 28, 2011, provisional application No. 61/502,210, filed on Jun. 28, 2011, provisional application No. 61/582,882, filed on Jan. 4, 2012.

In the Claims  
Claim 1, Col. 6, lines 56/57 should read:  
    A method for filtering an input signal ~~carried out in device that includes a dispersive delay line~~ comprising:

Claim 1, Col. 6, line 64 should read:  
feeding the mixed signal to ~~said~~ a forward dispersive delay Signed and Sealed this  
First Day of October, 2013

Teresa Stanek Rea  
*Deputy Director of the United States Patent and Trademark Office*